(12) United States Patent
Lin et al.

(10) Patent No.: US 8,370,358 B2
(45) Date of Patent: Feb. 5, 2013

(54) TAGGING CONTENT WITH METADATA PRE-FILTERED BY CONTEXT

(75) Inventors: Jyh-Han Lin, Mercer Island, WA (US); Vanessa Tieh-Su Wu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 12/562,632

(22) Filed: Sep. 18, 2009

(65) Prior Publication Data

US 2011/0072015 A1 Mar. 24, 2011

(51) Int. Cl.
*G06F 7/00* (2006.01)
*G06F 17/30* (2006.01)

(52) U.S. Cl. ...................................... 707/737
(58) Field of Classification Search ............... 707/999.5, 707/737, 999.005
See application file for complete search history.

(56) References Cited

U.S. PATENT DOCUMENTS

| 7,009,643 | B2 | 3/2006 | Nakamura et al. | |
|---|---|---|---|---|
| 7,234,106 | B2 * | 6/2007 | Simske ........................ | 715/230 |
| 7,248,285 | B2 | 7/2007 | Needham | |
| 7,925,833 | B2 * | 4/2011 | Sato et al. ..................... | 711/118 |
| 2003/0033602 | A1 * | 2/2003 | Gibbs et al. ..................... | 725/46 |
| 2003/0184653 | A1 | 10/2003 | Ohkubo | |
| 2003/0187984 | A1 | 10/2003 | Banavar et al. | |
| 2004/0021780 | A1 | 2/2004 | Kogan | |
| 2006/0007315 | A1 | 1/2006 | Singh | |
| 2006/0221190 | A1 | 10/2006 | Limberis et al. | |
| 2007/0150487 | A1 * | 6/2007 | Christian et al. ............. | 707/100 |
| 2009/0003797 | A1 | 1/2009 | Nash | |
| 2009/0083260 | A1 * | 3/2009 | Artom et al. ...................... | 707/5 |
| 2009/0249355 | A1 * | 10/2009 | Kaarela et al. ................. | 719/313 |
| 2009/0307261 | A1 * | 12/2009 | Lindley et al. ............. | 707/103 R |
| 2010/0076976 | A1 * | 3/2010 | Sotirov et al. .................. | 707/737 |
| 2010/0094627 | A1 * | 4/2010 | Katpelly et al. ............... | 704/235 |
| 2010/0180218 | A1 * | 7/2010 | Boston et al. .................. | 715/759 |
| 2010/0268720 | A1 * | 10/2010 | Spivack et al. ................. | 707/756 |
| 2010/0277611 | A1 * | 11/2010 | Holt et al. .................... | 348/231.2 |
| 2011/0066642 | A1 * | 3/2011 | Gopalakrishna et al. ..... | 707/770 |

OTHER PUBLICATIONS

Proβ, Benjamin, et al., "iPiccer: Automatically retrieving and inferring tagged location information from web repositories", MobileHCI, Bonn, Germany, Sep. 15-18, 2009, pp. 1-2.*
Lindstaedt, Stefanie, et al., "Recommending tags for pictures based on text, visual content and user content", ICIW '08, Athens, Greece, Jun. 8-13, 2008, pp. 506-511.*
Abdollahian, Golnaz, et al., "User Generated Video Annotation Using Geo-Tagged Image Databases", ICME 2009, New York, NY, Jun. 28-Jul. 3, 2009, pp. 610-613.*
Lee, Benjamin N., et al., "A Scalable Service for Photo Annotation, Sharing, and Search", MM '06, Santa Barbara, CA, Oct. 23-27, 2006, pp. 699-702.*
Ames, Morgan, et al., "Why We Tag: Motivations for Annotation in Mobile and Online Media", CHI 2007, San Jose, CA, Apr. 28-May 3, 2007, pp. 971-980.*
Rost, Mattias, et al., "Tools for Students Doing Mobile Fieldwork", WMUTE 2008, Beijing, China, Mar. 23-26, 2008, pp. 74-81.*

(Continued)

*Primary Examiner* — Aleksandr Kerzhner

(57) ABSTRACT

Generate tags for content from metadata pre-filtered based on context. A plurality of data items is accessed. Each of the data items has metadata. A context for a user is determined (e.g., at a moment of content capture). One or more of the data items are selected based on the determined context. Upon receipt of content, the received content is compared with the selected data items to identify matches. Metadata is selected from the metadata associated with the matching data items. The selected metadata is associated with the captured content.

19 Claims, 6 Drawing Sheets

OTHER PUBLICATIONS

Ames, et al., "Why We Tag: Motivations for Annotation in Mobile and Online Media", Retrieved at <<http://infolab.stanford.edu/~mor/research/chi2007-Ames-whyWeTag.pdf>>, CHI 2007, Apr. 28-May 3, 2007, San Jose, California, USA, pp. 10.

Davis, et al., "From Context to Content: Leveraging Context to Infer Media Metadata", Retrieved at <<http://luci.ics.uci.edu/websiteContent/weAreLuci/biographies/faculty/djp3/LocalCopy/pdf_63900590-3243-4FA0-845E4BF832AA8BCC.pdf>>, MM'04, Oct. 10-16, 2004, New York, New York, USA, pp. 8.

Wilhelm, et al., "Photo Annotation on a Camera Phone", Retrieved at <<http://fusion.sims.berkeley.edu/GarageCinema/pubs/pdf/pdf_618CD97D-C7AD-4B7C-9E386944D430BC0D.pdf>>, CHI 2004, "Late Breaking Results Paper", Apr. 24-29, 2004, Vienna, Austria, pp. 1403-1406.

* cited by examiner

TAGGING CONTENT WITH METADATA PRE-FILTERED BY CONTEXT

BACKGROUND

The availability of content recording functionality on computing devices has furthered the popularity of social networking applications. For example, with the cameras and voice recorders included in many mobile telephones, users are capturing and providing more content than ever before. With the increased amount of captured content, some users have attempted to manually annotate or tag each content item with a caption or identifier. However, this manual process is time-consuming and laborious.

Some existing systems have attempted to automate content annotation by suggesting tags based on the location of the mobile telephone at the time of capture. The suggestions take the form of physical and cultural features obtained from a Geographic Names Information System (GNIS) database. Other existing systems attempt to identify an event associated with the content by comparing the date and time of content capture to calendar entries of the user. Each of these two example systems, however, is directed to a specific database of annotations, and thus is limited in the type of annotations provided.

SUMMARY

Embodiments of the disclosure enable context-enriched automatic tagging. Each of a plurality of data items associated with a user has metadata associated therewith. A context for the user is determined. One or more of the plurality of data items are selected based on the determined context. Received content is compared with the selected data items to enable identification of one or more of the selected data items. Metadata is selected from the metadata associated with the identified data items. The selected metadata is associated with the received content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
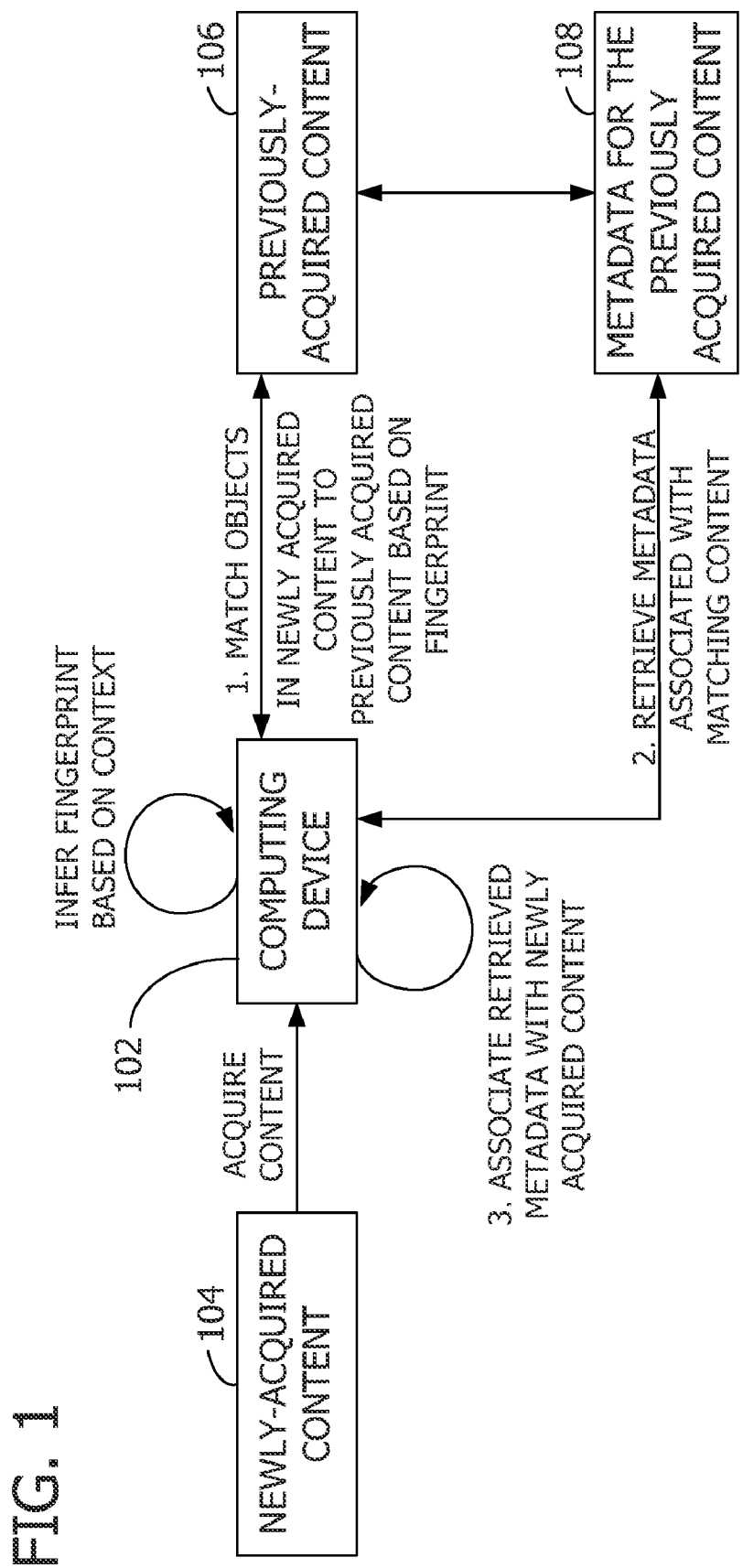
FIG. 1 is an exemplary block diagram illustrating a computing device tagging newly-acquired content with metadata from previously-acquired content.

Referring to the figures, embodiments of the disclosure enable, at least, the automated recognition and tagging of content using metadata 108 pre-filtered by context information. The pre-filtered metadata represents possibly relevant metadata identified using the context information. The pre-filtered metadata may be referred to as a "fingerprint." The fingerprint reduces the amount of metadata to search, reduces the amount of user input when creating tags, enables personalized tagging, Referring again to FIG. 1, an exemplary block diagram illustrates a computing device 102 tagging newly-acquired content 104 with metadata 108 from previously-acquired content 106. The elements illustrated in FIG. 1 operate to enable context-enriched automatic tagging. In some embodiments, the computing device 102 represents a plurality of computing devices programmed to implement the functionality described herein. The computing device 102 determines the context for a user and/or computing device 102. Determining the context includes, for example, determining a location of the computing device 102 or user, or determining one or more of the following user-specific data: user behavior, user activity, user purchase history, search query history, profile data, user files, and an application program being executed to capture the content.

Alternatively or in addition, the context may be explicitly defined by the user (e.g., the user selects a pre-defined profile or otherwise provides the context). The context is determined at the approximate time of acquiring the content (e.g., shortly before or after the content is acquired). Alternatively or in addition, the context may be determined some time prior to acquiring the content (e.g., the user and computing device 102 have been in the same location). The context may be determined or updated each time content is acquired, or once for a plurality of instances of content acquisition.

The computing device 102 identifies metadata 108 that is possibly relevant based on the determined context. The metadata 108 is identified from previously-acquired content. Identifying the possibly relevant metadata may be referred to as inferring a fingerprint, pre-filtering the metadata 108, narrowing the metadata 108 to be searched, or the like. In some embodiments, the possibly relevant metadata is identified before the content is acquired or otherwise accessed. In other embodiments in which the content has been acquired, the possibly relevant metadata is identified independent of the content or otherwise without reliance on the content. Further, the identified, possibly relevant metadata is applicable at least until the determined context changes.

The possibly relevant metadata may include metadata associated with the determined context. In some embodiments, the possibly relevant metadata includes metadata matching a location of the computing device 102, application programs being executed on or off the computing device 102 (e.g., application domains), a web browsing history of the user, images from a contacts list, meeting places in calendar entries, activities in a task list, products from products catalogs, or other metadata determined by the context where the content is captured.

The content may be obtained, retrieved, received, accessed, pushed, pulled, or the like. For example, the computing device 102 may actively seek the content or may passively receive the content, in various embodiments. The content includes, for example, audio, text, video, and images.

The previously-acquired content 106 includes pre-existing structured data and unstructured data, including data acquired by the user and/or data acquired by other users. The previously-acquired content 106 may be stored local to the computing device 102 (e.g., in memory internal to the computing device 102) or remote from the computing device 102 (e.g., in cloud storage). The previously-acquired content 106 may also have been acquired by other users, or merely provided by content providers. For example, the previously-acquired content 106 may include data stored on social network, or other private or public repositories. In some embodiments, the computing device 102 accesses the previously-acquired content 106 stored local to the computing device 102 and, depending on resource constraints such as bandwidth and battery level, also accesses the previously-acquired content 106 stored remote from the computing device 102.

Metadata 108 describing the previously-acquired content 106 is associated with the previously-acquired content 106. The metadata 108 may be stored with the previously-acquired content 106, or separate from the previously-acquired content 106.

In some embodiments, the computing device 102 analyzes the newly-acquired content 104 using the identified, possibly relevant metadata to identify matches with the previously-acquired content 106. For example, an image (or a portion thereof) from the previously-acquired content 106 may be found in the newly-acquired content 104 using image recognition algorithms. The computing device 102 retrieves the metadata 108 associated with the matching content from the previously-acquired content 106. The retrieved metadata is associated with the newly-acquired content 104. In some embodiments, the newly-acquired content 104 and retrieved metadata are stored as part of the previously-acquired content 106 and metadata 108, respectively.

In other embodiments, the operations illustrated in FIG. 1 are performed by another computing device (e.g., executing a web service to provide the metadata for the newly-acquired content 104).

Figure 2:
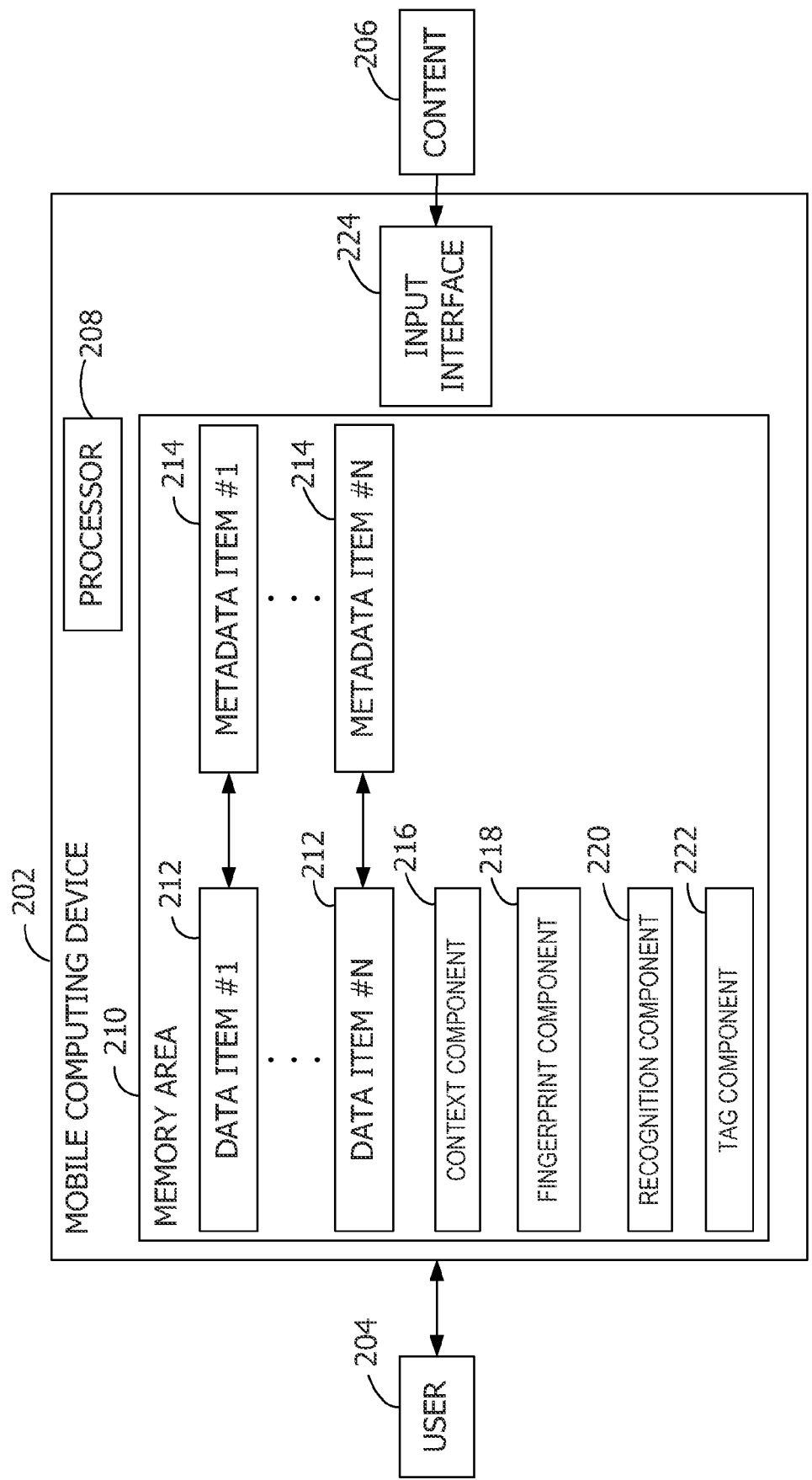
FIG. 2 is an exemplary block diagram illustrating a mobile computing device matching received content with stored data items based on user context.

Referring next to FIG. 2, an exemplary block diagram illustrates a mobile computing device 202 matching received content 206 with stored data items 212 based on user context. The mobile computing device 202 includes at least a memory area 210 and a processor 208. The memory area 210, or other computer-readable media, stores the plurality of data items 212 such as data item #1 through data item #N. In some embodiments, the data items 212 include, but are not limited to, one or more of the following: calendar entries, task entries, contacts, image files, video files, audio files, objects within the image files, objects within the video files, blog entries, and microblog entries. Alternatively or in addition, the data items 212 represent metadata sources. The data items 212 may be stored locally as in the example of FIG. 2, or stored remotely such as by a web service (e.g., a social networking web site). In some embodiments, the data items 212 are associated with a user 204 of the mobile computing device 202. In other embodiments, the data items 212 may be associated with one or more of a plurality of users. Each of the plurality of data items 212 has metadata items 214 associated therewith, such as metadata item #1 through metadata item #N.

The mobile computing device 202 further includes one or more interfaces such as input interface 224. The interfaces include, for example, a network interface, a camera, an audio recording device, or any other interface for receiving content 206.

The memory area 210, or one or more computer-readable media, further stores computer-executable components for implementing aspects of the disclosure. Exemplary components include a context component 216, a fingerprint component 218, a recognition component 220, and a tag component 222. These components are described below with reference to FIG. 3.

In general, the memory area 210 is associated with the mobile computing device 202. For example, in FIG. 2, the memory area 210 is within the mobile computing device 202. However, the memory area 210 includes any memory area internal to, external to, or accessible by mobile computing device 202. Further, the memory area 210 or any of the data stored thereon may be associated with any server or other computer, local or remote from the mobile computing device 202 (e.g., accessible via a network).

The processor 208 includes any quantity of processing units, and is programmed to execute computer-executable instructions for implementing aspects of the disclosure. The instructions may be performed by the processor 208 or by multiple processors executing within the mobile computing device 202, or performed by a processor external to the mobile computing device 202 (e.g., by a cloud service). In some embodiments, the processor 208 is programmed to execute instructions such as those illustrated in the figures (e.g., FIG. 3).

Figure 3:
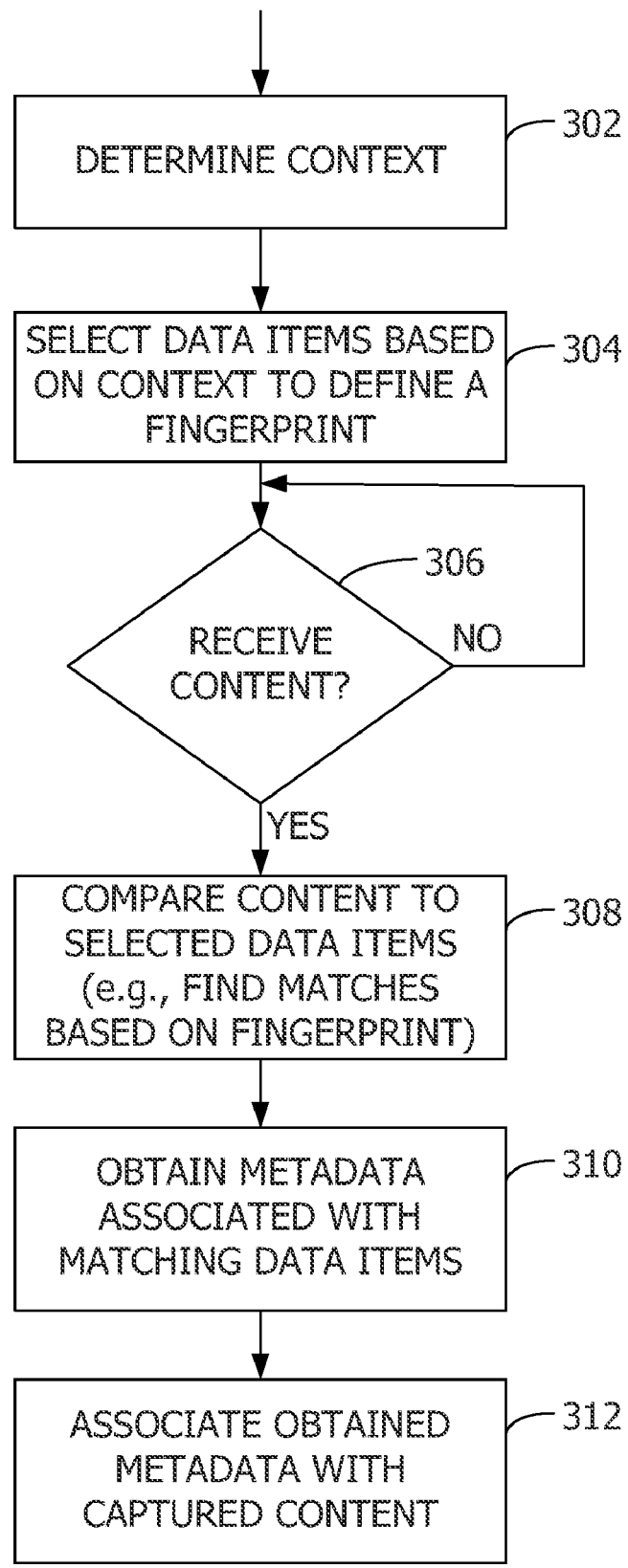
FIG. 3 is an exemplary flow chart illustrating a method for context-enriched automatic tagging of acquired content.

Referring next to FIG. 3, an exemplary flow chart illustrates a method for context-enriched automatic tagging of acquired content. In some embodiments, the operations illustrated in FIG. 3 are performed by the computing device 102 or the mobile computing device 202. In other embodiments, one or more of the operations illustrated in FIG. 3 are performed by another computing device (e.g., as a web service). At 302, the context is determined. For example, one or more keywords may be identified (e.g., Phoenix, Meeting with Bill, Conference Room A, Document Editor, Web Browser). One or more of the data items 212 are selected at 304 based on the determined context. The selected data items represent or define a fingerprint as described herein. When content is received (or accessed, retrieved, etc.) at 306, the received content is compared at 308 to the selected data items. For example, the received content may be searched for keywords determined from the context. In an example in which the selected data items include images of contacts from an address book and the received content is an image, the received image is compared to images of contacts to find matches. For example, facial recognition algorithms attempt to find the photos from the address book in the received image (e.g., the received image may include several faces).

Further, the received image may be compared to images from an image library of the user 204. For example, the received image may be searched for landmarks, people, text, and more from images in the image library. In such an example, aspects of the disclosure attempt to identify at least a portion of the images from the image library in the received image. If there are matching data items, the metadata associated with the matching data items is obtained at 310. The obtained metadata is associated with the received content at 312. For example, the received content is stored as one of the data items 212, and the obtained metadata is stored therewith.

In some embodiments, prior to associating the metadata with the received content, the metadata is presented to the user 204 for confirmation or editing. For example, the user 204 may accept the suggested metadata, manually edit the suggested metadata, or reject the suggestions.

In some embodiments, one or more computer-executable components, such as the components illustrated in FIG. 2, execute on the computing device 102 to perform the operations illustrated in FIG. 3. The context component 216, when executed by the processor 208, causes the processor 208 to determine the context for the user 204. The fingerprint component 218, when executed by the processor 208, causes the processor 208 to search for one or more of the data items 212 based on the determined context. For example, the fingerprint component 218 searches the computing device 102 of the user 204 and/or searches storage areas remote from the computing device 102 (e.g., social networking web sites, blogs, microblogs, etc.). The recognition component 220, when executed by the processor 208, causes the processor 208 to compare captured content with the data items 212 from the fingerprint component 218 and to identify one or more of the selected data items based on the comparison. The tag component 222, when executed by the processor 208, causes the processor 208 to define metadata for the accessed content based on the metadata associated with the data items identified by the recognition component 220. The tag component 222 further associates the defined metadata with the captured content.

Figure 4:
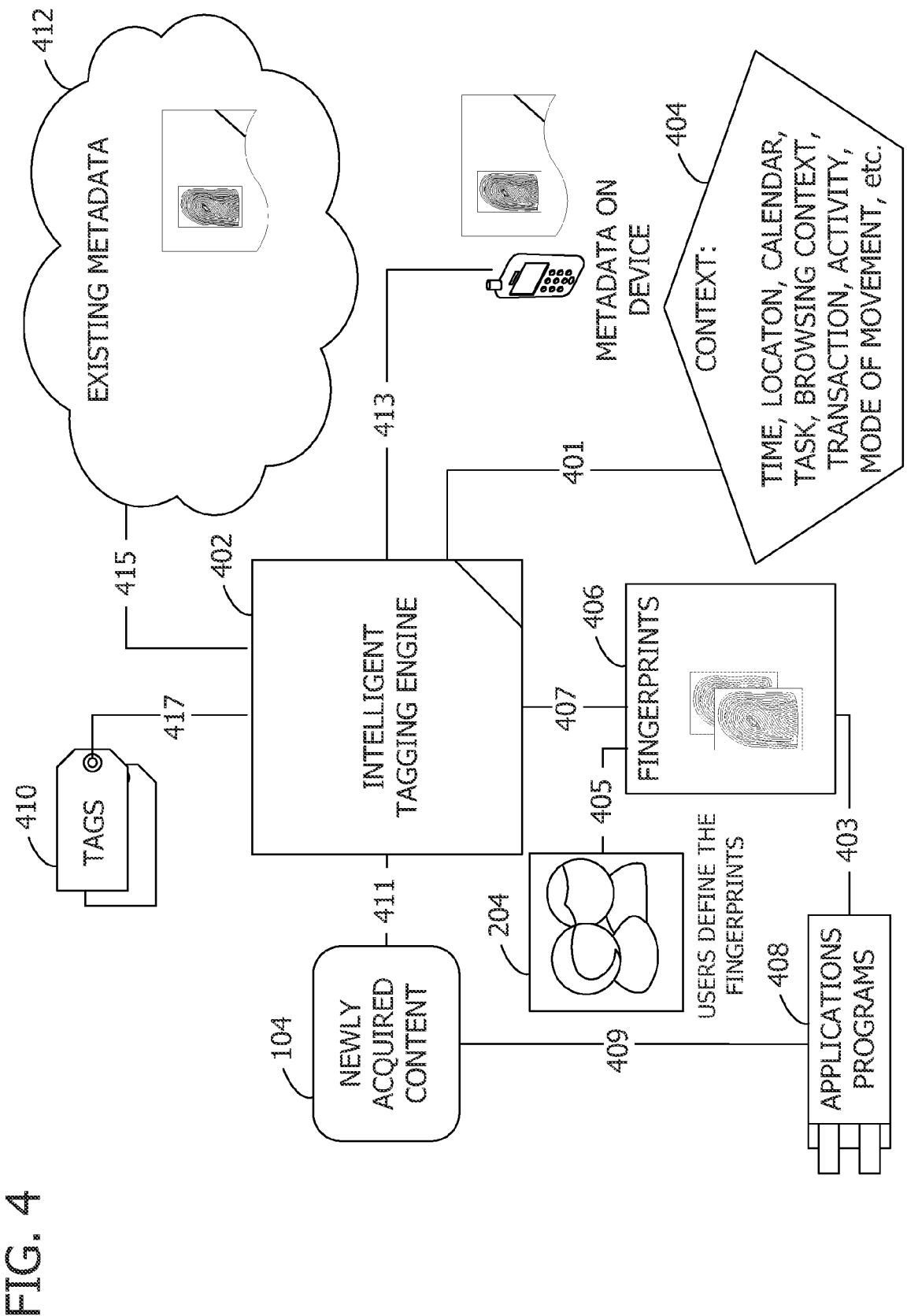
FIG. 4 is an exemplary block diagram illustrating an intelligent tagging engine generating metadata tags for captured content.

Referring next to FIG. 4, an exemplary block diagram illustrates an intelligent tagging engine 402 generating metadata tags 410 for captured content. In some embodiments, the tagging engine 402 executes on the mobile computing device 202 (e.g., see FIG. 2). In other embodiments, at least a portion of the functionality of the tagging engine 402 is performed by an entity (e.g., processor, web service, server, application program, computing device, etc.) remote from the computing device 102 of the user.

The tagging engine 402 determines context 404 for the computing device 102 of the user at 401. The context 404 includes, for example, the current time, a location of the computing device 102 or the user, one or more task entries, one or more calendar entries, a browsing context, a transaction history for the user, user interaction with the computing device 102, or a mode of movement of the computing device 102. Other contextual information is contemplated by aspects of the disclosure. Possibly relevant metadata is identified (e.g., one or more fingerprints 406 are defined). The fingerprints 406 may be inferred from one or more application programs 408 executing on or off the computing device 102 at 403 (e.g., the application domain). The relevant fingerprints 406 may include, for example, images in application programs (e.g., messaging applications) that use contacts. The user may explicitly define the fingerprints 406 at 405 (e.g., the user selects "faces" in images). In the example of FIG. 4, the tagging engine 402 uses the determined context 404 to define or refine, at 407, the fingerprints 406. For example, location and proximity information may be used to further narrow the potential images to match. The fingerprints 406 may include a plurality of defined fingerprints 406 cached and available to the user who is engaged in content capture. In some embodiments, the user explicitly selects one or more of the cached fingerprints 406 before, during, or after content capture.

The application programs 408 capture the content at 409 (e.g., the newly-acquired content 104). The tagging engine 402 uses the defined fingerprints 406 to match objects in the newly-acquired content 104 at 411. The tagging engine 402 may also retrieve on-device metadata (e.g., metadata stored on the computing device 102) with matching fingerprints at 413. The tagging engine 402 may also retrieve or search existing metadata 412 at 415 with matching fingerprints. The tagging engine 402 creates tags 410 at 417 based on the metadata relevant to the captured content.

Figure 5:
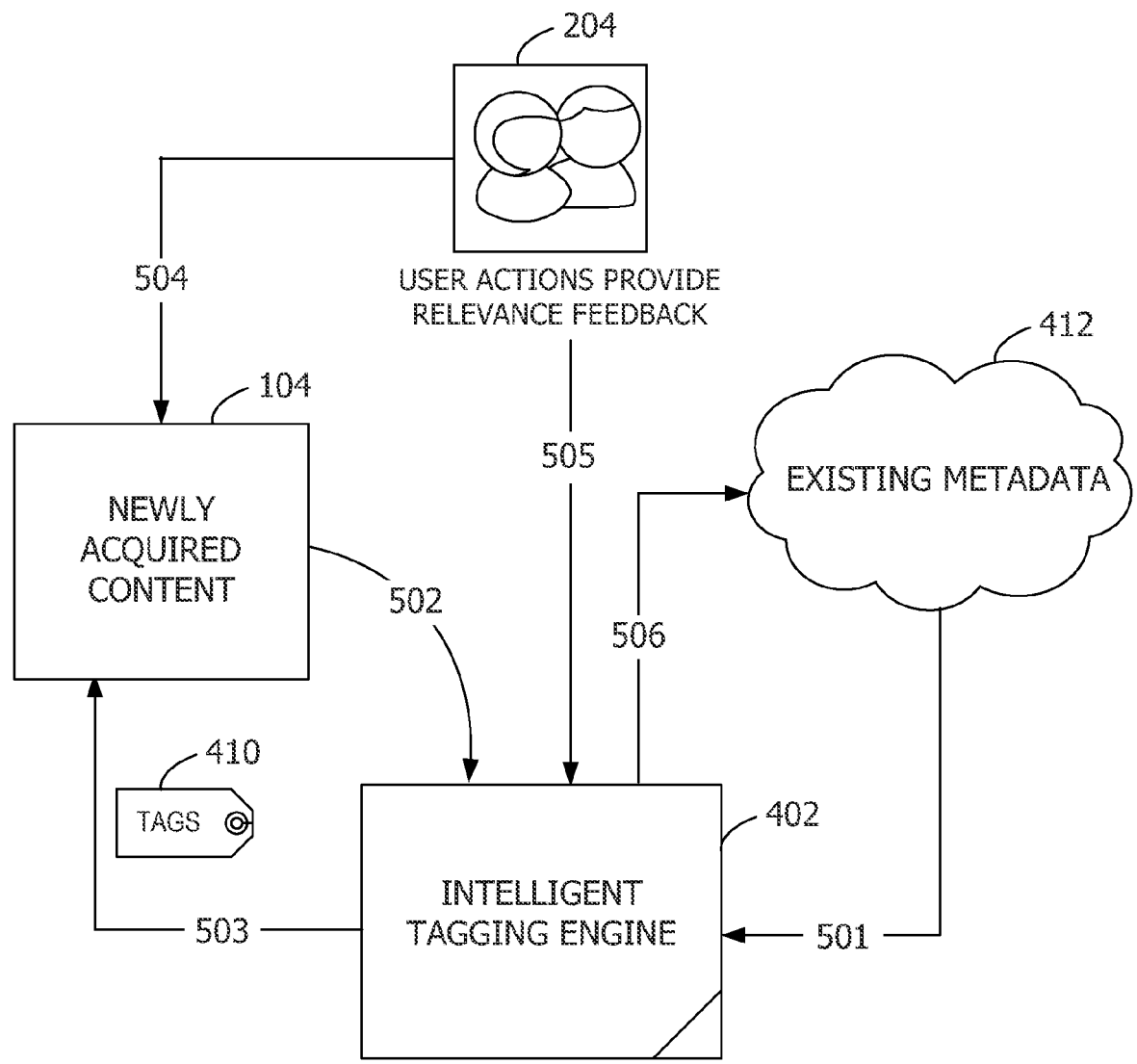
FIG. 5 is an exemplary block diagram illustrating the creation of metadata tags for content based in part on user actions.

Referring next to FIG. 5, an exemplary block diagram illustrates the creation of metadata tags 410 for content based in part on user actions. The tagging engine 402 extracts fingerprints at 501 based on context and/or existing metadata 412. Newly-acquired content 104 is processed by the tagging engine 402 at 502. The tagging engine 402 generates tags 410 for the newly-acquired content 104 at 503. The user rates the generated tags 410 at 504. The tagging engine 402 processes the user ratings at 505. The tagging engine 402 adjusts the existing metadata 412 at 506 based on the newly-acquired content 104 and the user ratings.

Figure 6:
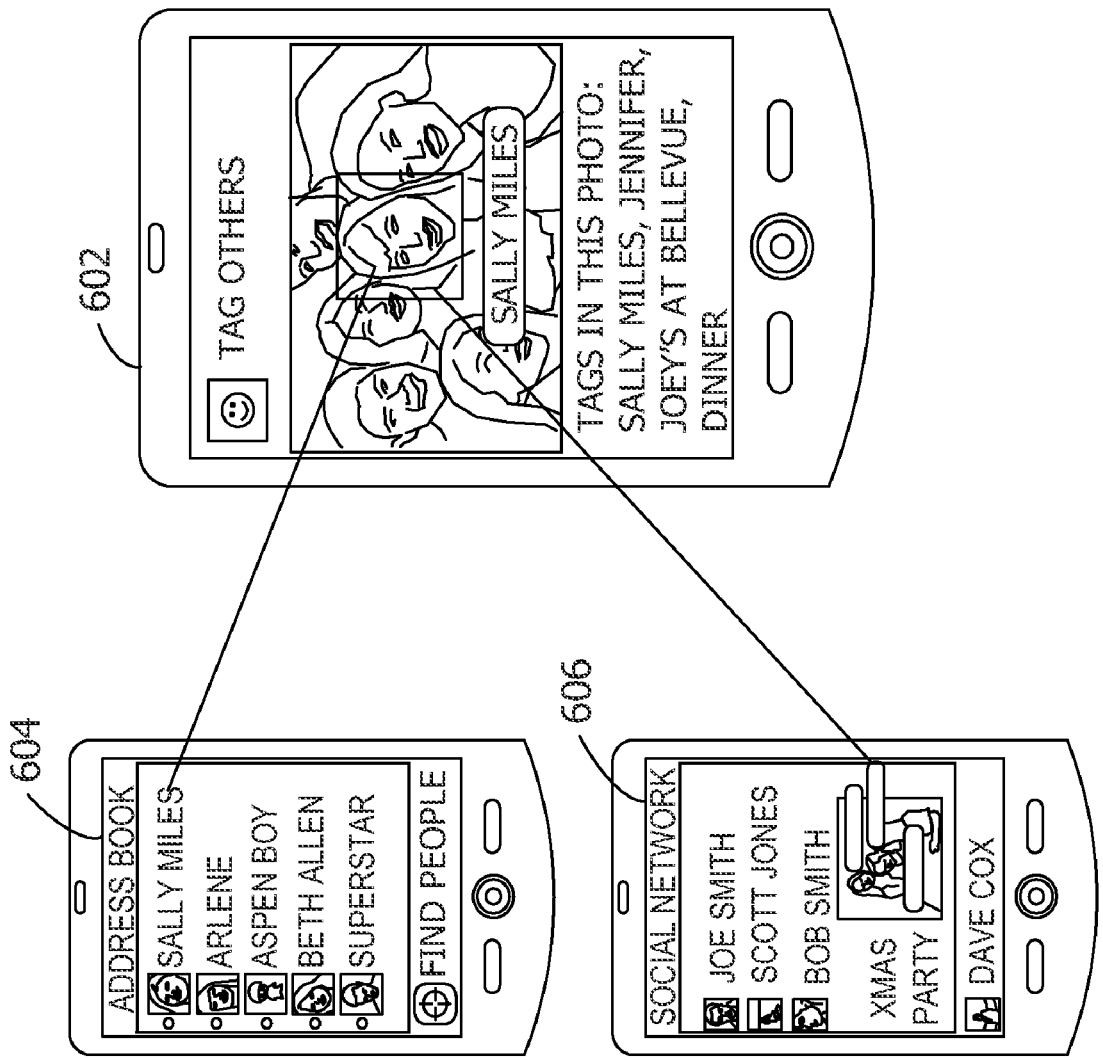
FIG. 6 is an exemplary block diagram illustrating the recognition of a face within an image based on data items associated with a user.

Referring next to FIG. 6, an exemplary block diagram illustrates the recognition of a face within an image based on data items 212 associated with the user 204. The user 204 executes an image capture application program on a mobile telephone 602. Aspects of the disclosure, executing on the mobile telephone 602, define a fingerprint based on the context. The context at least includes, in this example, that the image capture application program is executing, a location of the mobile telephone 602 (e.g., from a location provider from a calendar entry), a current time, and identification of the user 204. A fingerprint is defined based on the determined context. For example, the defined fingerprint indicates that possibly relevant metadata includes images from an address book 604 of the identified user 204, and one or more events corresponding to the current time (e.g., the moment of image capture) from calendar entries for the user 204 (e.g., including event descriptions, location names, and attendees for the events).

The user 204 takes a picture with the mobile telephone 602. The image capture application program captures the image and compares the captured image to the fingerprint (e.g., compares the captured image to the possibly relevant metadata). In this example, the captured image is compared to the images from the address book 604 of the identified user 204, and the events corresponding from the calendar entries for the user 204 (e.g., the event descriptions, location names, and attendees are searched for within the captured image). In this example, there is an image of "Sally Miles" in the address book 604 of the user 204. Alternatively or in addition, the image of Sally Miles (or other images) may be taken from a web page of the user 204 on a social network web site 606. Aspects of the disclosure compare the image of Sally Miles from the address book 604 to the captured image (e.g., using facial recognition analysis). In this example, a match is found between the image of Sally Miles from the address book 604 and one of the faces in the captured image. The tag "Sally Miles" is then created for the captured image.

Similarly, if the fingerprint included the event attendee "Jennifer", the event location "Joey's at Bellevue", and the event description "Dinner," aspects of the disclosure suggest these additional tags for association with the captured image.

Further Examples

Various implementations of the disclosure are contemplated. For example, embodiments of the disclosure recognize objects in a captured image using pictures or logos from a product catalog. The particular product catalog is selected based on, for example, recent purchasing or browsing by the user. In this example, the user captures the image while shopping at a mall.

In another example, an address book application program launches a camera application to capture an image of a contact. The tagging engine 402 infers, based on the execution of the address book application, that a relevant metadata source is the contacts database.

In still another example, the user browses the Internet for a new electronics product. The user sorts the available products based on price. In this example, the browsing behavior of sorting by price is one of the data items 212, while price is the metadata associated with the data item. Subsequently, aspects of the disclosure detect that the user enters a store (e.g., the context is determined). The stored browsing behavior and one or more electronic products catalogs are identified as possibly relevant based on the determined context (e.g., being in the store). Upon capture of an image of an electronics product in the store (e.g., the user takes a picture of a product), the image is compared to the electronic products catalogs. If there is a match, metadata associated with the matching product from the products catalogs is associated with the captured image. In this example, because of the previous browsing history, the price of the product is included as metadata for the captured image.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks 310 or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for context-enriched automatic tagging of the captured content based on the determined context and the selected data items 212, and exemplary means for inferring metadata for the captured content at the moment of capture.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for context-enriched automatic tagging, said system comprising:
   a memory area for storing a plurality of data items of a user of a mobile computing device, each of the plurality of data items having metadata associated therewith, said memory area being associated with the mobile computing device; and
   a processor programmed to:
      determine a context for the user when capturing content, said determined context including a location of the mobile computing device and user-specific data including one or more messages;
      pre-filter the plurality of data items by the determined context, the pre-filtered data items representing data items having metadata identified using the determined context, the pre-filtered data items indicating that the metadata includes one or more images from an address book of the user and one or more events corresponding to a current time from one or more calendar entries for the user;
      select one or more of the pre-filtered data items stored in the memory area based on the determined context;
      capture the content;
      compare the captured content with one or more of the selected data items;
      identify one or more of the selected data items based on the comparison;
      define metadata for the captured content based on the metadata associated with one or more of the identified data items; and
      store the captured content with the defined metadata in the memory area as a data item in the plurality of data items.

2. The system of claim 1, wherein the plurality of data items comprises one or more of the following: calendar entries, task entries, contacts, image files, video files, audio files, objects within the image files, and objects within the video files.

3. The system of claim 1, wherein the processor is programmed to determine the context based on the location associated with the mobile computing device.

4. The system of claim 1, wherein the processor is programmed to determine the context based on one or more of the following: user behavior, user activity, user purchase history, search query history, and an application program being executed to capture the content.

5. The system of claim 1, wherein the processor is further programmed to transmit the plurality of data items to a data storage area accessible by the mobile computing device via a network.

6. The system of claim 1, wherein the processor is further programmed to present the defined metadata for the captured content to the user for confirmation before storing the captured content with the defined metadata in the memory area.

7. The system of claim 1, further comprising means for context-enriched automatic tagging of the captured content based on the determined context and one or more of the selected data items.

8. The system of claim 1, further comprising means for inferring metadata for the captured content at the moment of capture.

9. A method comprising:
accessing a plurality of data items on at least a computing device associated with a user, each of the plurality of data items having metadata associated therewith;
determining a context for the user, said determined context including a location of the computing device and user-specific data including one or more messages;
pre-filtering the plurality of data items by the determined context, the pre-filtered data items indicating that the metadata includes one or more images from an address book of the user and one or more events corresponding to a current time from one or more calendar entries for the user;
selecting one or more of the pre-filtered data items based on the determined context;
receiving content;
comparing the received content with one or more of the selected data items;
identifying one or more of the selected data items based on said comparing;
selecting metadata from the metadata associated with one or more of the identified data items; and
associating the selected metadata with the received content.

10. The method of claim 9, further comprising storing the received content with the associated metadata as a data item in the plurality of data items, the metadata associated with one or more of the identified data items being applicable until the determined context for the user changes.

11. The method of claim 9, wherein determining the context for the user comprises identifying keywords, and wherein comparing the received content comprises searching the received content for the identified keywords.

12. The method of claim 9, wherein accessing the plurality of data items comprises accessing the address book and a social networking website associated with the user.

13. The method of claim 9, further comprising:
presenting the selected metadata to the user, wherein the user edits the presented metadata; and
receiving edited metadata from the user, wherein associating the selected metadata includes associating the edited metadata with the received content.

14. The method of claim 9, wherein selecting the one or more of the plurality of data items comprises selecting a first image, wherein receiving content comprises receiving a second image, and wherein comparing the received content with the selected data item comprises identifying at least a portion of the first image within the second image.

15. The method of claim 9, wherein determining a context for the user comprises determining the location of the computing device, and wherein selecting one or more of the plurality of data items comprises selecting one or more data items having metadata associated with the location.

16. One or more computer storage media storing computer-executable components, said components comprising:
a context component that when executed by at least one processor causes the at least one processor to determine a context for a user;
a fingerprint component that when executed by at least one processor causes the at least one processor to search on at least a computing device associated with the user for one or more data items based on the determined context, each of the data items having metadata associated therewith, the searching comprising pre-filtering the one or more data items based on the determined context, said determined context including a location of the computing device associated with the user and user-specific data including one or more messages, the pre-filtered data items indicating that the metadata includes one or more images from an address book of the user and one or more events corresponding to a current time from one or more calendar entries for the user;
a recognition component that when executed by at least one processor causes the at least one processor to compare captured content with one or more of the pre-filtered data items from the fingerprint component and to identify one or more of the pre-filtered data items based on the comparison; and
a tag component that when executed by at least one processor causes the at least one processor to define metadata for the captured content based on the metadata associated with the data items identified by the recognition component and to associate the defined metadata with the captured content.

17. The computer storage media of claim 16, wherein the fingerprint component searches for one or more of the data items on social networking websites.

18. The computer storage media of claim 16, wherein the tag component prompts the user to accept the defined metadata before associating the defined metadata with the captured content.

19. The computer storage media of claim 16, wherein the captured content comprises an image of one or more people, and wherein the recognition component compares the captured content with one or more of the data items from the fingerprint component by performing a facial recognition analysis.

* * * * *